(12) United States Patent
Chen et al.

(10) Patent No.: US 11,422,640 B2
(45) Date of Patent: Aug. 23, 2022

(54) MOUSE STRUCTURE

(71) Applicant: Chicony Electronics Co., Ltd., New Taipei (TW)

(72) Inventors: Tao-Kuan Chen, New Taipei (TW); Huei-Chen Wong, New Taipei (TW)

(73) Assignee: Chicony Electronics Co., Ltd., New Taipei (TW)

( * ) Notice: Subject to any disclaimer, the term of this patent is extended or adjusted under 35 U.S.C. 154(b) by 0 days.

(21) Appl. No.: 17/450,999

(22) Filed: Oct. 15, 2021

(65) Prior Publication Data
US 2022/0147164 A1    May 12, 2022

(30) Foreign Application Priority Data
Nov. 6, 2020  (TW) .................. 109138937

(51) Int. Cl.
*G06F 3/0354* (2013.01)
*G06F 3/0362* (2013.01)
*G06F 3/038* (2013.01)

(52) U.S. Cl.
CPC ........ *G06F 3/03543* (2013.01); *G06F 3/0362* (2013.01); *G06F 3/0383* (2013.01)

(58) Field of Classification Search
CPC .............. G06F 3/03543; G06F 3/0362; G06F 3/0383
See application file for complete search history.

(56) References Cited

U.S. PATENT DOCUMENTS

| | | | | |
|---|---|---|---|---|
| 5,952,997 A | * | 9/1999 | Hu ................... | G06F 3/0362 345/166 |
| 10,725,568 B1 | * | 7/2020 | Lin ................... | G06F 3/0362 |
| 2002/0158844 A1 | * | 10/2002 | McLoone ......... | G06F 3/03543 345/163 |
| 2020/0073488 A1 | * | 3/2020 | Cheng ............... | G06F 3/03543 |
| 2022/0011884 A1 | * | 1/2022 | Dou ................... | G06F 3/03543 |

FOREIGN PATENT DOCUMENTS

| CN | 2667575 Y | 12/2004 |
|---|---|---|
| TW | 202004436 A | 1/2020 |

* cited by examiner

*Primary Examiner* — Ariel A Balaoing
(74) *Attorney, Agent, or Firm* — CKC & Partners Co., LLC

(57) ABSTRACT

A mouse structure includes a base, a wheel, a shaft, a first and a second plates. The first and the second plates are disposed on the base. The shaft penetrates through an opening defined by a first lower surface and two first upper surfaces of the first plate and an opening defined by two second upper surfaces of the second plate. A first and a second sections of the shaft respectively connect between the first and the second sub-shafts and between the first and the third sub-shafts of the shaft. The first sub-shaft penetrates through the wheel. A distance between the first lower surface and the axis diminishes away from the second plate. A distance between the second upper surfaces diminishes away from the first plate. Profiles of the first and the second sections respectively match with the first lower surface and the second upper surfaces.

10 Claims, 8 Drawing Sheets

MOUSE STRUCTURE

RELATED APPLICATIONS

This application claims priority to Taiwanese Application Serial Number 109138937 filed Nov. 6, 2020, which is herein incorporated by reference.

BACKGROUND

Technical Field

The present disclosure relates to mouse structures.

Description of Related Art

With the rapid development of technology, application of computers has become an indispensable part of life. Apart from the general applications everyday, application of computers is becoming more and more diversified that computers are widely applied in commercial activities, studies and even entertainments.

It is well known that the mouse is a commonly used operating tool in computer applications. Generally speaking, the scroll wheel of a mouse is supported by the brackets at both sides. However, during the process of injection molding, the brackets at the two sides are often inclined to each other for the sake of demolding. Thus, the brackets form a V-shaped structure, which then results in the presence of an excessive space between the brackets and the scroll wheel is easily shifted between the brackets. This does not only affect the appearance of the mouse, but also affects the tactile feeling of the scroll wheel. Therefore, the industry has been working hard to improve this situation.

SUMMARY

A technical aspect of the present disclosure is to provide a mouse structure, which can restrict the magnitude of sideward movement of the scroll wheel, enhancing the quality of use of the mouse structure.

According to an embodiment of the present disclosure, a mouse structure includes a base plate, a first plate, a second plate, a scroll wheel and a shaft. The first plate is disposed on the base plate in a substantially perpendicular manner. The first plate includes a first lower restricting surface and two first upper restricting surfaces. The first lower restricting surface surrounds about an axis to form a semi-circle. The first upper restricting surfaces are respectively connected with two opposite ends of the first lower restricting surface. The first upper restricting surfaces respectively extend along a normal direction of the base plate. The first lower restricting surface and the first upper restricting surfaces together define a first opening. The second plate is disposed on the base plate in a substantially perpendicular manner. The second plate is substantially parallel with the first plate. The second plate includes two second upper restricting surfaces. The second upper restricting surfaces are opposite to each other. The second upper restricting surfaces extend along the normal direction. The second upper restricting surfaces define a second opening therebetween. The second opening is away from the base plate. The shaft penetrates through the first opening and the second opening along the axis. The shaft includes a first subsidiary shaft, a second subsidiary shaft, a third subsidiary shaft, a first gradient section and a second gradient section. The first gradient section is connected between the first subsidiary shaft and the second subsidiary shaft. The second gradient section is connected between the first subsidiary shaft and the third subsidiary shaft. The first subsidiary shaft penetrates through the scroll wheel and is located between the first plate and the second plate. A first diameter of the first subsidiary shaft is longer than a second diameter of the second subsidiary shaft. The first diameter of the first subsidiary shaft is longer than a third diameter of the third subsidiary shaft. A first distance between the first lower restricting surface and the axis gradually diminishes as being away from the second plate. A second distance between the second upper restricting surfaces gradually diminishes as being away from the first plate. A profile of the first gradient section matches with the first lower restricting surface. A profile of the second gradient section matches with the second upper restricting surfaces.

In one or more embodiments of the present disclosure, a third distance between the first upper restricting surfaces gradually diminishes as being away from the second plate. A profile of the first gradient section matches with the first upper restricting surfaces.

In one or more embodiments of the present disclosure, the first upper restricting surfaces are respectively a flat surface.

In one or more embodiments of the present disclosure, the first upper restricting surfaces are respectively a curved surface.

In one or more embodiments of the present disclosure, the first lower restricting surface is a flat surface inclined with the axis.

In one or more embodiments of the present disclosure, the first lower restricting surface is a curved surface.

In one or more embodiments of the present disclosure, the second upper restricting surfaces are respectively a flat surface.

In one or more embodiments of the present disclosure, the second upper restricting surfaces are respectively a curved surface.

In one or more embodiments of the present disclosure, the second plate includes a second lower restricting surface. The second lower restricting surface is connected between the second upper restricting surfaces. The second lower restricting surface and the second upper restricting surfaces together define the second opening. The second lower restricting surface and the base plate have a fourth distance therebetween. The first lower restricting surface and the base plate have a fifth distance therebetween. The fourth distance is shorter than the fifth distance. The mouse structure further includes a signal button. The signal button is disposed on the base plate and elastically supports the third subsidiary shaft. The signal button is configured to provide a first signal to a processor as the signal button is pressed by the third subsidiary shaft.

In one or more embodiments of the present disclosure, the mouse structure further includes an encoder. The encoder is disposed on the base plate and is mechanically connected with the first subsidiary shaft. The encoder is configured to provide a second signal to a processor as the first subsidiary shaft is rotated.

The above-mentioned embodiments of the present disclosure have at least the following advantages:

(1) By maintaining the narrow gap between the first lower restricting surface of the first plate and the first gradient section, and maintaining the narrow gap between each of the second upper restricting surfaces of the second plate and the second gradient section, when using the mouse structure, the relative position between the scroll wheel and the first plate and between the scroll wheel and the second plate can be effectively restricted. This means that the scroll wheel will not significantly move towards the first plate and away from the second plate, nor significantly move towards the second plate and away from the first plate. Thus, the quality of use of the mouse structure can be enhanced.

(2) The maintenance of the position of the scroll wheel relative to the first plate and the second plate, is achieved by maintaining the narrow gap between the first lower restricting surface of the first plate and the first gradient section and by maintaining the narrow gap between each of the second upper restricting surfaces of the second plate and the second gradient section. Therefore, the position of the scroll wheel can still be effectively restricted by the first plate and the second plate, even though the sides of the first plate and the second plate away from the base plate are relatively farther away from each other due to the design of easy demolding during the process of injection molding of the first plate and the second plate.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
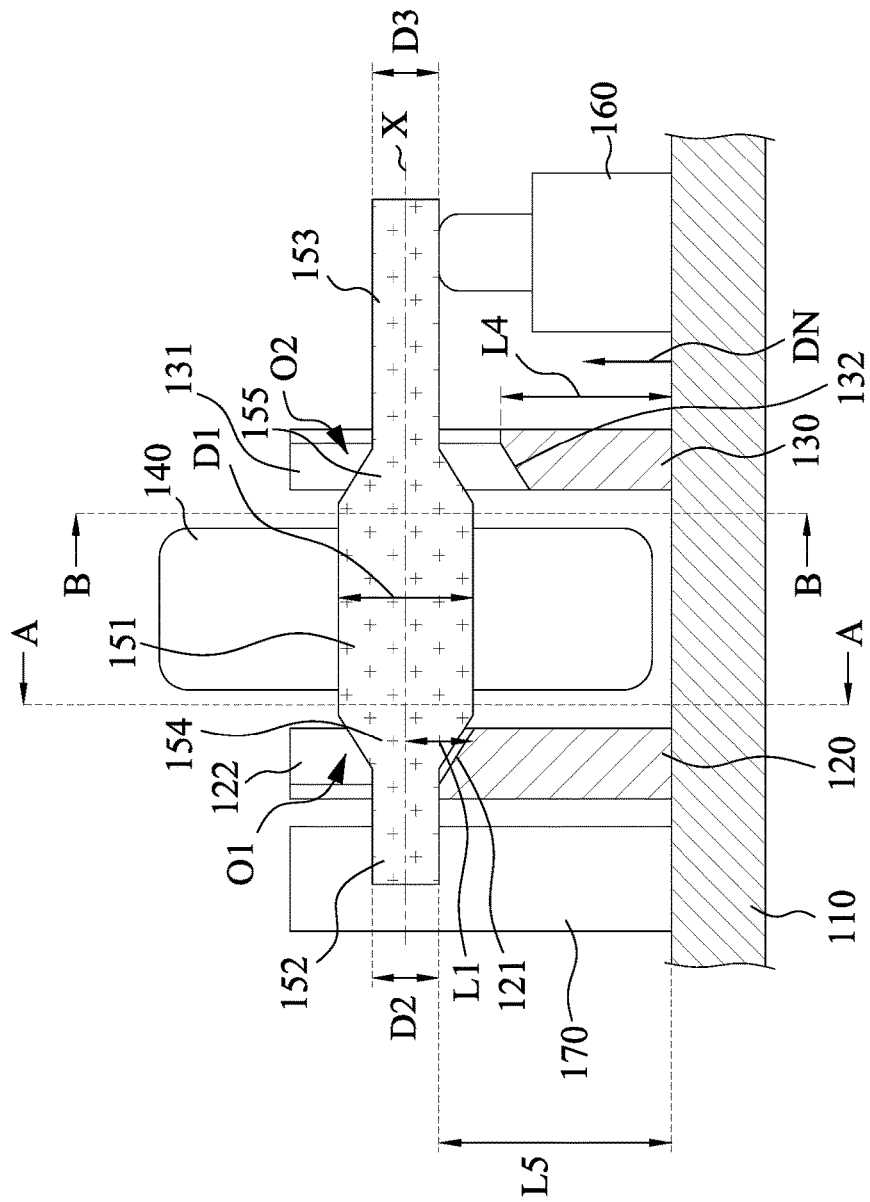
FIG. 1 is a cross-sectional view of a mouse structure according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meanings as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
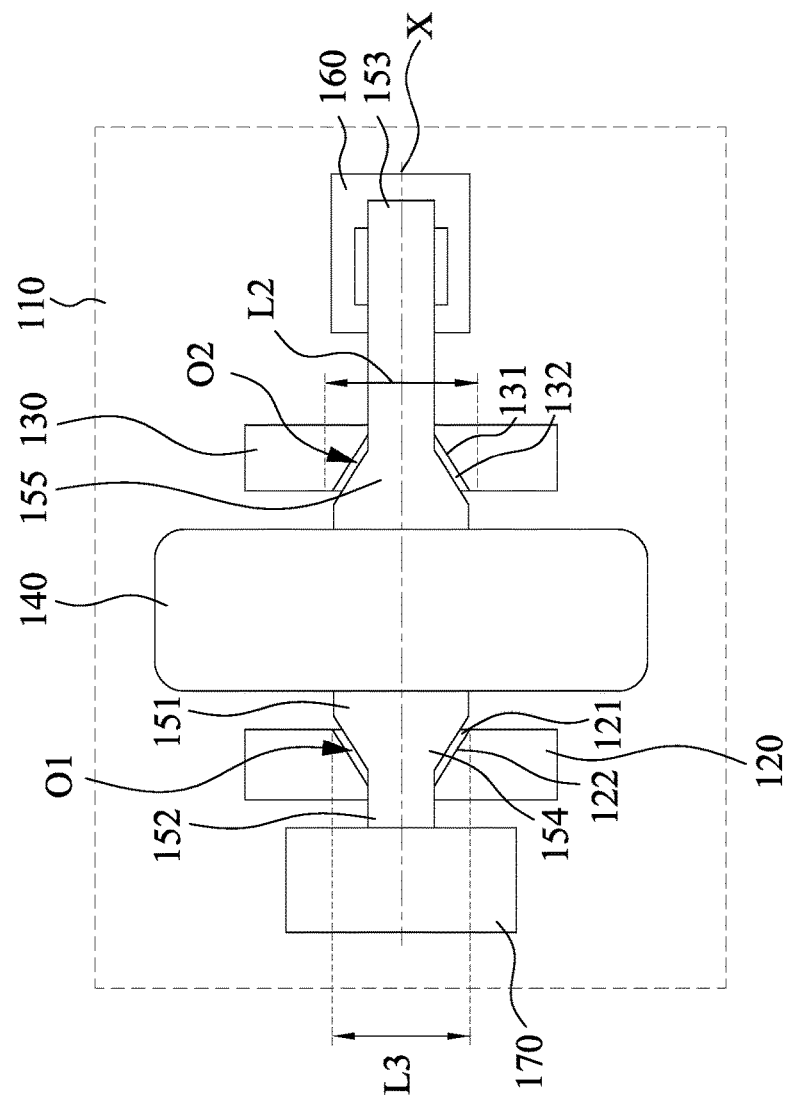
FIG. 2 is a top view of the mouse structure of FIG. 1.
Figure 3:
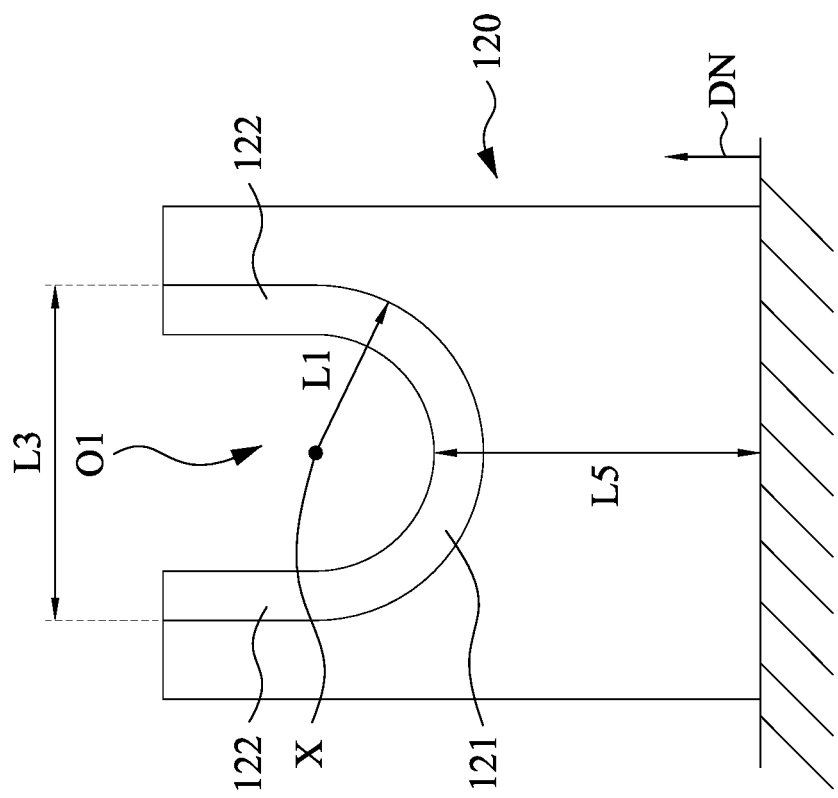
FIG. 3 is a cross-sectional view along the section line A-A of FIG. 1, in which the shaft is omitted.

Reference is made to FIGS. 1-3. FIG. 1 is a cross-sectional view of a mouse structure 100 according to an embodiment of the present disclosure. FIG. 2 is a top view of the mouse structure 100 of FIG. 1. FIG. 3 is a cross-sectional view along the section line A-A of FIG. 1, in which the shaft 150 is omitted. For the sake of drawing simplification, the shaft 150 is not shown in FIG. 3. In this embodiment, as shown in FIGS. 1-3, a mouse structure 100 includes a base plate 110, a first plate 120, a second plate 130, a scroll wheel 140 and a shaft 150. The first plate 120 is disposed on the base plate 110 in a substantially perpendicular manner. The first plate 120 includes a first lower restricting surface 121 and two first upper restricting surfaces 122. The first lower restricting surface 121 surrounds about an axis X to form a semi-circle. The first upper restricting surfaces 122 are respectively connected with two opposite ends of the first lower restricting surface 121. The first upper restricting surfaces 122 respectively extend along a normal direction DN of the base plate 110. The first lower restricting surface 121 and the first upper restricting surfaces 122 together define a first opening O1. The second plate 130 is disposed on the base plate 110 in a substantially perpendicular manner. The second plate 130 is substantially parallel with the first plate 120.

Figure 4:
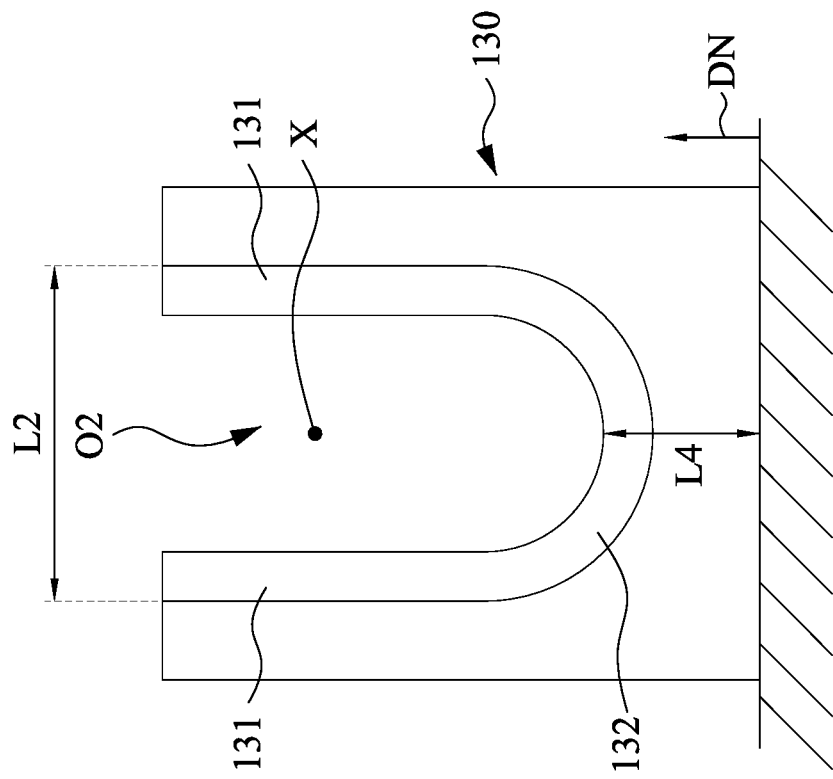
FIG. 4 is a cross-sectional view along the section line B-B of FIG. 1, in which the shaft is omitted.

Reference is made to FIG. 4. FIG. 4 is a cross-sectional view along the section line B-B of FIG. 1, in which the shaft 150 is omitted. For the sake of drawing simplification, the shaft 150 is not shown in FIG. 4. In this embodiment, as shown in FIGS. 1-2 and 4, the second plate 130 includes two second upper restricting surfaces 131. The second upper restricting surfaces 131 are opposite to each other. The second upper restricting surfaces 131 extend along the normal direction DN. The second upper restricting surfaces 131 define a second opening O2 therebetween. The second opening O2 is away from the base plate 110.

Moreover, as shown in FIGS. 1-2, the shaft 150 penetrates through the first opening O1 and the second opening O2 along the axis X. The shaft 150 includes a first subsidiary shaft 151, a second subsidiary shaft 152, a third subsidiary shaft 153, a first gradient section 154 and a second gradient section 155. The first gradient section 154 is connected between the first subsidiary shaft 151 and the second subsidiary shaft 152. The second gradient section 155 is connected between the first subsidiary shaft 151 and the third subsidiary shaft 153. The first subsidiary shaft 151 penetrates through the scroll wheel 140 and is located between the first plate 120 and the second plate 130. In this embodiment, a first diameter D1 of the first subsidiary shaft 151 is longer than a second diameter D2 of the second subsidiary shaft 152, while the first diameter D1 of the first subsidiary shaft 151 is longer than a third diameter D3 of the third subsidiary shaft 153. As shown in FIGS. 1 and 3, a first distance L1 between the first lower restricting surface 121 of the first plate 120 and the axis X gradually diminishes as the first distance L1 is away from the second plate 130. It is worth to note that, a profile of the first gradient section 154 matches with the first lower restricting surface 121 of the first plate 120.

Furthermore, in this embodiment, the first lower restricting surface 121 of the first plate 120 is a flat surface inclined with the axis X. In other words, the first lower restricting surface 121 forms a chamfer on the first plate 120. In addition, as mentioned above, since the profile of the first gradient section 154 matches with the first lower restricting surface 121 of the first plate 120, a profile of the first gradient section 154 is also a flat surface. Since both of the profiles of the first lower restricting surface 121 and the first gradient section 154 are flat surfaces, a narrow gap can be easily maintained between the first lower restricting surface 121 of the first plate 120 and the first gradient section 154, facilitating in restricting the relative position between the first plate 120 and the scroll wheel 140 connected to the shaft 150.

Correspondingly, in this embodiment, a third distance L3 between the first upper restricting surfaces 122 gradually diminishes as the third distance L3 is away from the second plate 130, such that the first lower restricting surface 121 of the first plate 120 can be connected between the first upper restricting surfaces 122. It is worth to note that, a profile of the first gradient section 154 also matches with the first upper restricting surfaces 122. Therefore, the first gradient section 154 of the shaft 150 can move towards the first lower restricting surface 121 through the first upper restricting surfaces 122 during assembly. To be more specific, in this embodiment, the first upper restricting surfaces 122 of the first plate 120 are respectively a flat surface.

Relatively, as shown in FIGS. 2 and 4, a second distance L2 between the second upper restricting surfaces 131 of the second plate 130 gradually diminishes as the second distance L2 is away from the first plate 120. It is worth to note that, a profile of the second gradient section 155 matches with the second upper restricting surfaces 131 of the second plate 130. Therefore, the second gradient section 155 of the shaft 150 is suitable to accommodate between the first upper restricting surfaces 122.

Furthermore, in this embodiment, the second upper restricting surfaces 131 of the second plate 130 are respectively a flat surface. In other words, the second upper restricting surfaces 131 form two chamfers on the second plate 130. In addition, as mentioned above, since the profile of the second gradient section 155 matches with the second upper restricting surfaces 131 of the second plate 130, a profile of the second gradient section 155 is also a flat surface. Since both of the profiles of the second upper restricting surfaces 131 and the second gradient section 155 are flat surfaces, a narrow gap can be easily maintained between each of the second upper restricting surfaces 131 of the second plate 130 and the second gradient section 155, facilitating in restricting the relative position between the second plate 130 and the scroll wheel 140 connected to the shaft 150.

In a nut shell, by maintaining the narrow gap between the first lower restricting surface 121 of the first plate 120 and the first gradient section 154, and maintaining the narrow gap between each of the second upper restricting surfaces 131 of the second plate 130 and the second gradient section 155, when using the mouse structure 100, the relative position between the scroll wheel 140 and the first plate 120 and between the scroll wheel 140 and the second plate 130 can be effectively restricted. This means that the scroll wheel 140 will not significantly move towards the first plate 120 and away from the second plate 130, nor significantly move towards the second plate 130 and away from the first plate 120. Thus, the quality of use of the mouse structure 100 can be enhanced.

In practical applications, the base plate 110, the first plate 120 and the second plate 130 of the mouse structure 100 are an integrally formed structure. For example, the base plate 110, the first plate 120 and the second plate 130 of the mouse structure 100 can be fabricated by injection molding. As shown in FIGS. 1-2, the scroll wheel 140 is located between the first plate 120 and the second plate 130. As mentioned above, the maintenance of the position of the scroll wheel 140 relative to the first plate 120 and the second plate 130, is achieved by maintaining the narrow gap between the first lower restricting surface 121 of the first plate 120 and the first gradient section 154 and by maintaining the narrow gap between each of the second upper restricting surfaces 131 of the second plate 130 and the second gradient section 155. Therefore, the position of the scroll wheel 140 can still be effectively restricted by the first plate 120 and the second plate 130, even though the sides of the first plate 120 and the second plate 130 away from the base plate 110 are relatively farther away from each other due to the design of easy demolding during the process of injection molding of the first plate 120 and the second plate 130.

Moreover, as shown in FIGS. 1 and 4, the second plate 130 includes a second lower restricting surface 132. The second lower restricting surface 132 is connected between the second upper restricting surfaces 131. The second lower restricting surface 132 and the second upper restricting surfaces 131 together define the second opening O2. The second lower restricting surface 132 and the base plate 110 have a fourth distance L4 therebetween. On the other hand, as shown in FIGS. 1 and 3, the first lower restricting surface 121 and the base plate 110 have a fifth distance L5 therebetween. In this embodiment, the fourth distance L4 is shorter than the fifth distance L5. In practical applications, the mouse structure 100 further includes a signal button 160. The signal button 160 is disposed on the base plate 110 and elastically supports the third subsidiary shaft 153. The signal button 160 is configured to provide a first signal to a processor (not shown) as the signal button 160 is pressed by the third subsidiary shaft 153.

As mentioned above, since the fourth distance L4 is shorter than the fifth distance L5, when operating the mouse structure 100, the user can press on the scroll wheel 140, such that the shaft 150 penetrating through the scroll wheel 140 is inclined. Moreover, the second gradient section 155 of the shaft 150 moves towards the second lower restricting surface 132, such that the third subsidiary shaft 153 of the shaft 150 presses on the signal button 160, which then provides the first signal to the processor.

Furthermore, as shown in FIGS. 1-2, the mouse structure 100 further includes an encoder 170. The encoder 170 is disposed on the base plate 110 and is mechanically connected with the first subsidiary shaft 151. The encoder 170 is configured to provide a second signal to the processor as the first subsidiary shaft 151 is rotated. When the user rotates the scroll wheel 140 connected to the shaft 150, the shaft 150 is also rotated relative to the encoder 170, and the encoder 170 then provides the second signal to the processor.

Figure 5:
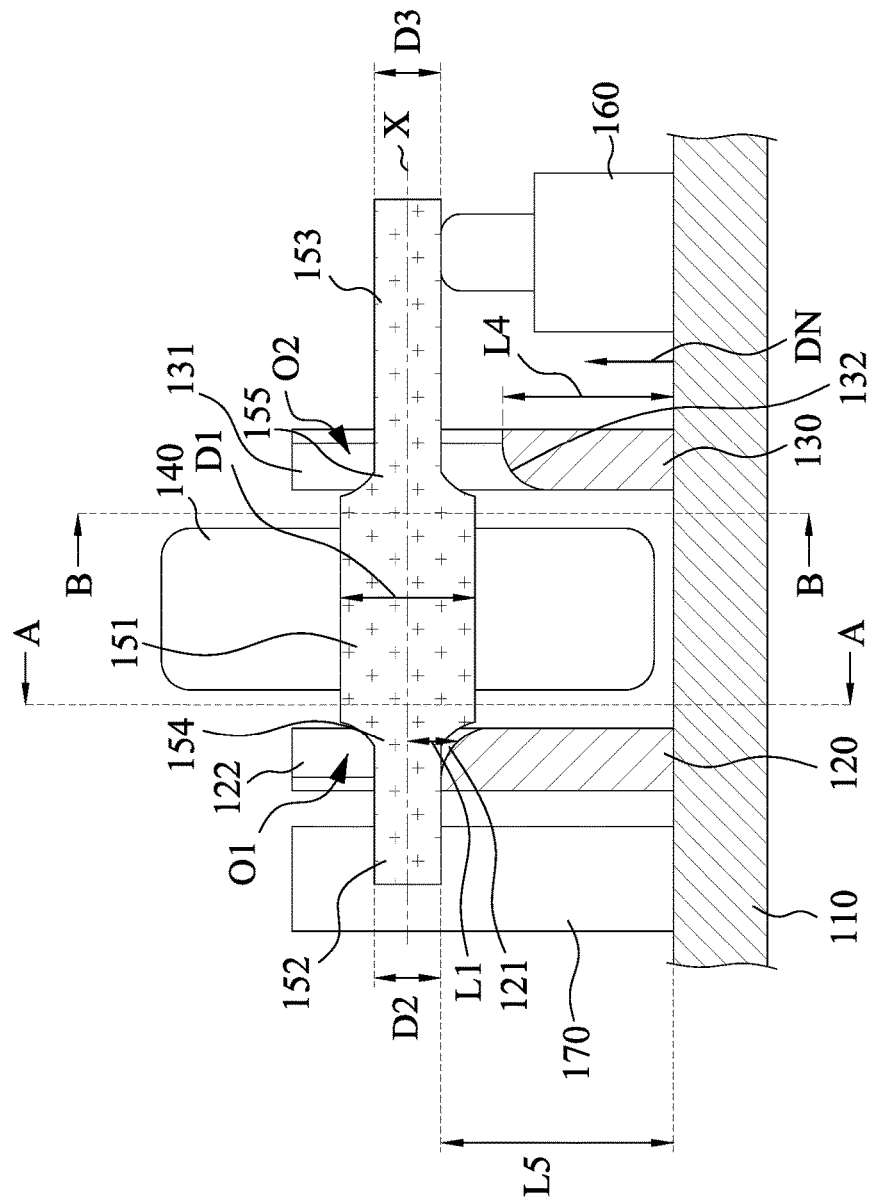
FIG. 5 is a cross-sectional view of a mouse structure according to another embodiment of the present disclosure.

Reference is made to FIG. 5. FIG. 5 is a cross-sectional view of a mouse structure 100 according to another embodiment of the present disclosure. In this embodiment, as shown in FIG. 5, the first lower restricting surface 121 of the first plate 120 is a convex curved surface. In other words, the first lower restricting surface 121 forms a fillet on the first plate 120. In addition, as mentioned above, since the profile of the first gradient section 154 matches with the first lower restricting surface 121 of the first plate 120, a profile of the first gradient section 154 is a concave curved surface. Since the profiles of the first lower restricting surface 121 and the first gradient section 154 are respectively a convex curved surface and a concave curved surface, a narrow gap can be easily maintained between the first lower restricting surface 121 of the first plate 120 and the first gradient section 154, facilitating in restricting the relative position between the first plate 120 and the scroll wheel 140 connected to the shaft 150.

Figure 6:
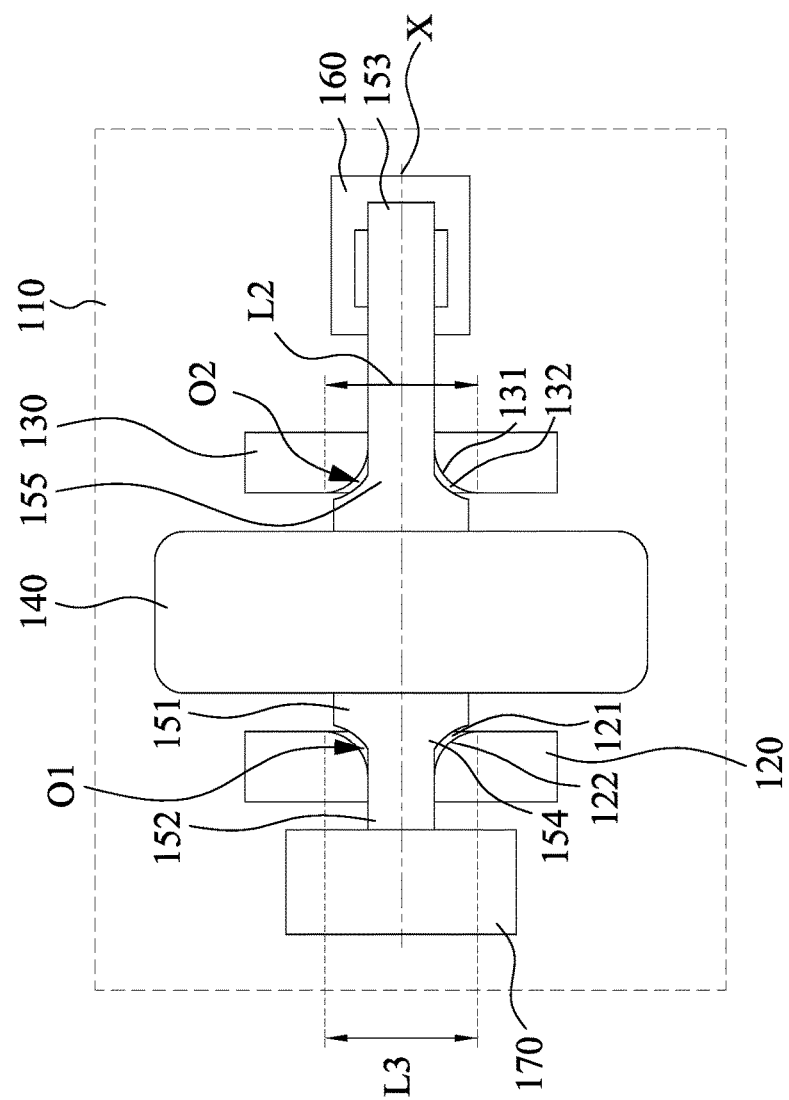
FIG. 6 is a top view of the mouse structure of FIG. 5.

Reference is made to FIG. 6. FIG. 6 is a top view of the mouse structure 100 of FIG. 5. In this embodiment, as shown in FIG. 6, a third distance L3 between the first upper restricting surfaces 122 gradually diminishes as the third distance L3 is away from the second plate 130, such that the first lower restricting surface 121 of the first plate 120 can be connected between the first upper restricting surfaces 122. It is worth to note that, a profile of the first gradient section 154 also matches with the first upper restricting surfaces 122. Therefore, the first gradient section 154 of the shaft 150 can move towards the first lower restricting surface 121 through the first upper restricting surfaces 122 during assembly. To be more specific, in this embodiment, the first upper restricting surfaces 122 of the first plate 120 are respectively a convex curved surface.

Relatively, as shown in FIG. 6, a second distance L2 between the second upper restricting surfaces 131 of the second plate 130 gradually diminishes as the second distance L2 is away from the first plate 120. It is worth to note that, a profile of the second gradient section 155 matches with the second upper restricting surfaces 131 of the second plate 130. Therefore, the second gradient section 155 of the shaft 150 is suitable to accommodate between the first upper restricting surfaces 122.

Furthermore, in this embodiment, the second upper restricting surfaces 131 of the second plate 130 are respectively a convex curved surface. In other words, the second upper restricting surfaces 131 form two fillets on the second plate 130. In addition, as mentioned above, since the profile of the second gradient section 155 matches with the second upper restricting surfaces 131 of the second plate 130, a profile of the second gradient section 155 is a concave curved surface. Since the profiles of each of the second upper restricting surfaces 131 are respectively a convex curved surface and the profile of the second gradient section 155 is a concave curved surface, a narrow gap can be easily maintained between each of the second upper restricting surfaces 131 of the second plate 130 and the second gradient section 155, facilitating in restricting the relative position between the second plate 130 and the scroll wheel 140 connected to the shaft 150.

Figure 7:
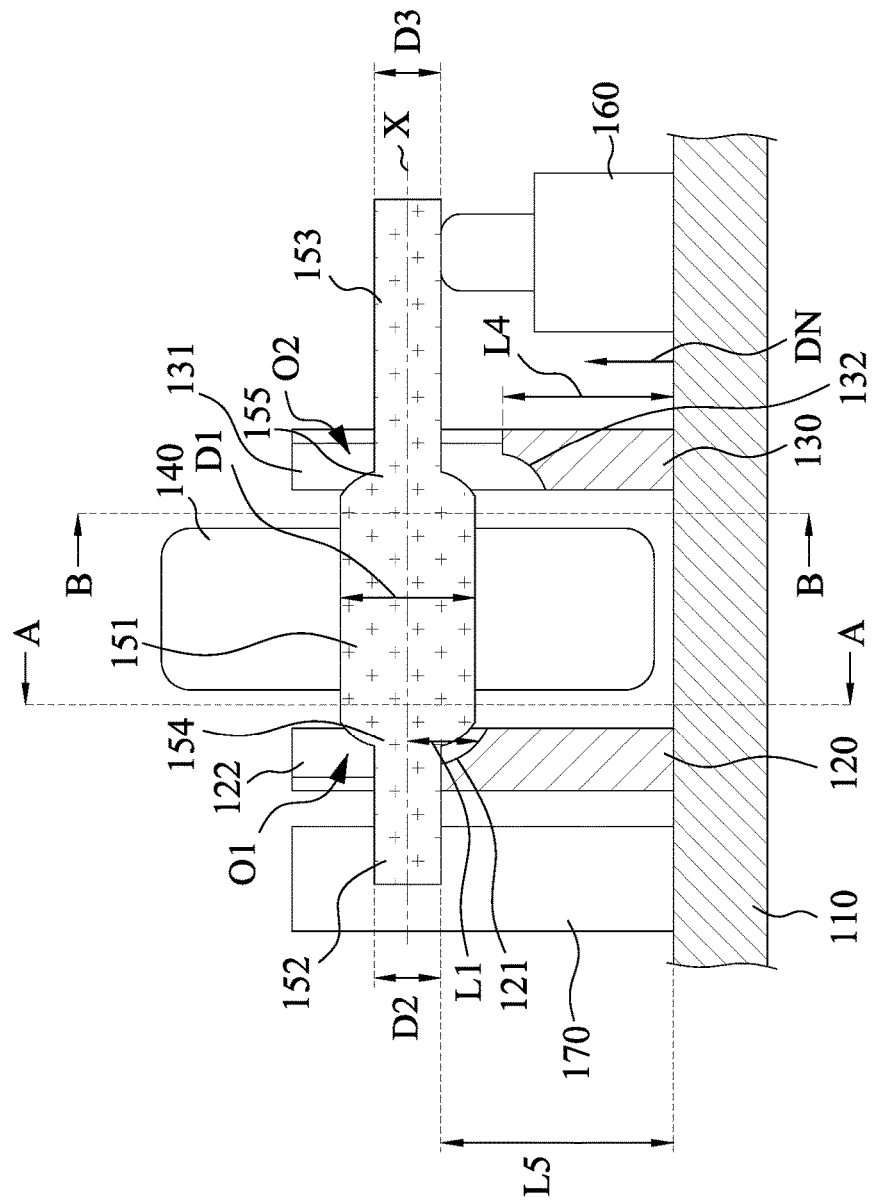
FIG. 7 is a cross-sectional view of a mouse structure according to a further embodiment of the present disclosure.

Reference is made to FIG. 7. FIG. 7 is a cross-sectional view of a mouse structure 100 according to a further embodiment of the present disclosure. In this embodiment, as shown in FIG. 7, the first lower restricting surface 121 of the first plate 120 is a concave curved surface. In addition, as mentioned above, since the profile of the first gradient section 154 matches with the first lower restricting surface 121 of the first plate 120, a profile of the first gradient section 154 is a convex curved surface. Since the profiles of the first lower restricting surface 121 and the first gradient section 154 are respectively a concave curved surface and a convex curved surface, a narrow gap can be easily maintained between the first lower restricting surface 121 of the first plate 120 and the first gradient section 154, facilitating in restricting the relative position between the first plate 120 and the scroll wheel 140 connected to the shaft 150.

Figure 8:
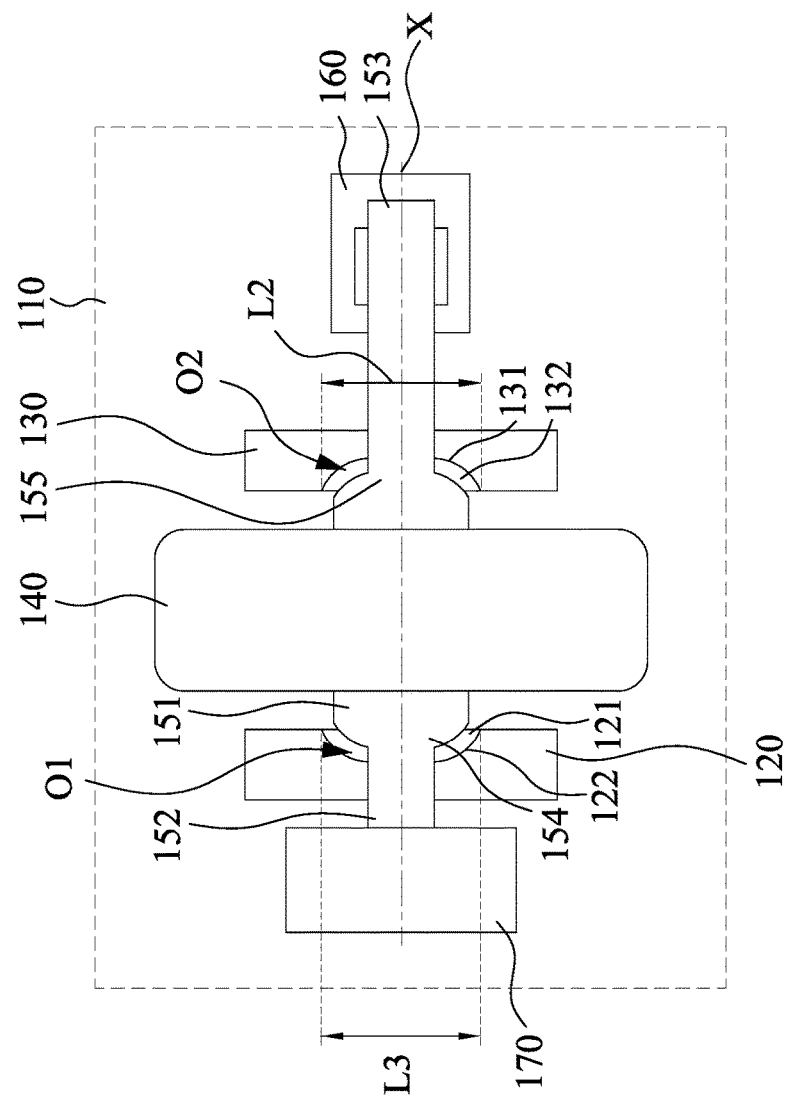
FIG. 8 is a top view of the mouse structure of FIG. 7.

Reference is made to FIG. 8. FIG. 8 is a top view of the mouse structure 100 of FIG. 7. In this embodiment, as shown in FIG. 8, a third distance L3 between the first upper restricting surfaces 122 gradually diminishes as the third distance L3 is away from the second plate 130, such that the first lower restricting surface 121 of the first plate 120 can be connected between the first upper restricting surfaces 122. It is worth to note that, a profile of the first gradient section 154 also matches with the first upper restricting surfaces 122. Therefore, the first gradient section 154 of the shaft 150 can move towards the first lower restricting surface 121 through the first upper restricting surfaces 122 during assembly. To be more specific, in this embodiment, the first upper restricting surfaces 122 of the first plate 120 are respectively a concave curved surface.

Relatively, as shown in FIG. 8, a second distance L2 between the second upper restricting surfaces 131 of the second plate 130 gradually diminishes as the second distance L2 is away from the first plate 120. It is worth to note that, a profile of the second gradient section 155 matches with the second upper restricting surfaces 131 of the second plate 130. Therefore, the second gradient section 155 of the shaft 150 is suitable to accommodate between the first upper restricting surfaces 122.

Furthermore, in this embodiment, the second upper restricting surfaces 131 of the second plate 130 are respectively a concave curved surface. In addition, as mentioned above, since the profile of the second gradient section 155 matches with the second upper restricting surfaces 131 of the second plate 130, a profile of the second gradient section 155 is a convex curved surface. Since the profiles of each of the second upper restricting surfaces 131 are respectively a concave curved surface and the profile of the second gradient section 155 is a convex curved surface, a narrow gap can be easily maintained between each of the second upper restricting surfaces 131 of the second plate 130 and the second gradient section 155, facilitating in restricting the relative position between the second plate 130 and the scroll wheel 140 connected to the shaft 150.

In conclusion, the aforementioned embodiments of the present disclosure have at least the following advantages:

(1) By maintaining the narrow gap between the first lower restricting surface of the first plate and the first gradient section, and maintaining the narrow gap between each of the second upper restricting surfaces of the second plate and the second gradient section, when using the mouse structure, the relative position between the scroll wheel and the first plate and between the scroll wheel and the second plate can be effectively restricted. This means that the scroll wheel will not significantly move towards the first plate and away from the second plate, nor significantly move towards the second plate and away from the first plate. Thus, the quality of use of the mouse structure can be enhanced.

(2) The maintenance of the position of the scroll wheel relative to the first plate and the second plate, is achieved by maintaining the narrow gap between the first lower restricting surface of the first plate and the first gradient section and by maintaining the narrow gap between each of the second upper restricting surfaces of the second plate and the second gradient section. Therefore, the position of the scroll wheel can still be effectively restricted by the first plate and the second plate, even though the sides of the first plate and the second plate away from the base plate are relatively farther away from each other due to the design of easy demolding during the process of injection molding of the first plate and the second plate.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A mouse structure, comprising:
   a base plate;
   a first plate disposed on the base plate in a substantially perpendicular manner, the first plate comprising a first lower restricting surface and two first upper restricting surfaces, the first lower restricting surface surrounding about an axis to form a semi-circle, the first upper restricting surfaces being respectively connected with two opposite ends of the first lower restricting surface and extending along a normal direction of the base plate, the first lower restricting surface and the first upper restricting surfaces together defining a first opening;
   a second plate disposed on the base plate in a substantially perpendicular manner and being substantially parallel with the first plate, the second plate comprising two second upper restricting surfaces, the second upper restricting surfaces being opposite to each other and extending along the normal direction, the second upper restricting surfaces defining a second opening therebetween, the second opening being away from the base plate;
   a scroll wheel; and
   a shaft penetrating through the first opening and the second opening along the axis, the shaft comprising a first subsidiary shaft, a second subsidiary shaft, a third subsidiary shaft, a first gradient section and a second gradient section, the first gradient section being connected between the first subsidiary shaft and the second subsidiary shaft, the second gradient section being connected between the first subsidiary shaft and the third subsidiary shaft, the first subsidiary shaft penetrating through the scroll wheel and being located between the first plate and the second plate, a first diameter of the first subsidiary shaft is longer than a second diameter of the second subsidiary shaft, the first diameter of the first subsidiary shaft is longer than a third diameter of the third subsidiary shaft,
   wherein a first distance between the first lower restricting surface and the axis gradually diminishes as being away from the second plate, a second distance between the second upper restricting surfaces gradually diminishes as being away from the first plate, a profile of the first gradient section matches with the first lower restricting surface, and a profile of the second gradient section matches with the second upper restricting surfaces.

2. The mouse structure of claim 1, wherein a third distance between the first upper restricting surfaces gradually diminishes as being away from the second plate, a profile of the first gradient section matches with the first upper restricting surfaces.

3. The mouse structure of claim 2, wherein the first upper restricting surfaces are respectively a flat surface.

4. The mouse structure of claim 2, wherein the first upper restricting surfaces are respectively a curved surface.

5. The mouse structure of claim 1, wherein the first lower restricting surface is a flat surface inclined with the axis.

6. The mouse structure of claim 1, wherein the first lower restricting surface is a curved surface.

7. The mouse structure of claim 1, wherein the second upper restricting surfaces are respectively a flat surface.

8. The mouse structure of claim 1, wherein the second upper restricting surfaces are respectively a curved surface.

9. The mouse structure of claim 1, wherein the second plate comprises a second lower restricting surface, the second lower restricting surface is connected between the second upper restricting surfaces, the second lower restricting surface and the second upper restricting surfaces together define the second opening, the second lower restricting surface and the base plate have a fourth distance therebetween, the first lower restricting surface and the base plate have a fifth distance therebetween, the fourth distance is shorter than the fifth distance, the mouse structure further comprises:
   a signal button disposed on the base plate and elastically supporting the third subsidiary shaft, the signal button is configured to provide a first signal to a processor as the signal button is pressed by the third subsidiary shaft.

10. The mouse structure of claim 1, further comprising:
    an encoder disposed on the base plate and mechanically connected with the first subsidiary shaft, the encoder being configured to provide a second signal to a processor as the first subsidiary shaft is rotated.

* * * * *